US012715489B2

(12) United States Patent
Ferrise, II et al.

(10) Patent No.: US 12,715,489 B2
(45) Date of Patent: Aug. 25, 2026

(54) SYSTEMS AND METHODS FOR INDEPENDENT CHECKING AND HEALING OF POSITIVE TRAIN CONTROL SYSTEMS

(71) Applicant: BNSF Railway Company, Fort Worth, TX (US)

(72) Inventors: Charles W. Ferrise, II, Fort Worth, TX (US); Kris D. McManaman, Denton, TX (US); Pradeep Kumar Mohan Rao, Fort Worth, TX (US); Kyle W. Ross, Grapevine, TX (US)

(73) Assignee: BNSF Railway Company

( * ) Notice: Subject to any disclaimer, the term of this patent is extended or adjusted under 35 U.S.C. 154(b) by 38 days.

(21) Appl. No.: 19/013,857

(22) Filed: Jan. 8, 2025

(65) Prior Publication Data

US 2026/0192833 A1 Jul. 9, 2026

(51) Int. Cl.
*B61L 27/57* (2022.01)
*B61L 27/30* (2022.01)
(Continued)

(52) U.S. Cl.
CPC ............... *B61L 27/57* (2022.01); *B61L 27/30* (2022.01); *B61L 27/70* (2022.01); *G07C 5/008* (2013.01);
(Continued)

(58) Field of Classification Search
CPC .......... B61L 27/57; B61L 27/30; B61L 27/70; G07C 5/008; G07C 5/0808; G61L 2205/00
(Continued)

(56) References Cited

U.S. PATENT DOCUMENTS 7,263,475 B2 8/2007 Hawthorne et al.
7,529,610 B1 5/2009 Fenske
(Continued)

FOREIGN PATENT DOCUMENTS

CN 101741493 A 6/2010
CN 102514601 B 5/2014
(Continued)

OTHER PUBLICATIONS

U.S. Department of Transportation: "Vital Positive Train Control Research and Development—Final Report"; Report; Jul. 2011; pp. 1-77; DOT/FRA/ORD-11/14.
(Continued)

*Primary Examiner* — Yi-Kai Wang
(74) *Attorney, Agent, or Firm* — Enrique Sanchez, Jr.; Juan J Vasquez

(57) ABSTRACT

According to some embodiments, a method for monitoring a positive train control system includes receiving a plurality of first mandatory directives from a train authority computing system and receiving a plurality of second mandatory directives from a train bulletin computing system. The method further includes storing the plurality of first mandatory directives and the plurality of second mandatory directives as issued mandatory directives in a database. The method further includes receiving a plurality of onboard mandatory directives from a PTC back-office computing system and storing the onboard mandatory directives in the database. The method further includes comparing the issued mandatory directives with the onboard mandatory directives to identify any mismatches between the issued mandatory directives and the onboard mandatory directives. The method further includes electronically communicating one or more instructions for the PTC back-office computing
(Continued)

system to remediate a mismatch between the issued mandatory directives and the onboard mandatory directives.

20 Claims, 4 Drawing Sheets

(51) Int. Cl.
*B61L 27/70* (2022.01)
*G07C 5/00* (2006.01)
*G07C 5/08* (2006.01)

(52) U.S. Cl.
CPC ........ *G07C 5/0808* (2013.01); *B61L 2205/00* (2013.01)

(58) Field of Classification Search
USPC ........................................................... 701/19
See application file for complete search history.

(56) References Cited

U.S. PATENT DOCUMENTS

| | | | |
|---|---|---|---|
| 7,792,089 | B2 | 9/2010 | Aiken et al. |
| 8,090,486 | B2 | 1/2012 | Meyer et al. |
| 8,328,143 | B2 | 12/2012 | Groves, Jr. |
| 9,290,191 | B2 | 3/2016 | Ghaly |
| 9,688,296 | B2 | 6/2017 | Shubs, Jr. |
| 9,845,099 | B2 | 12/2017 | Kurz |
| 9,956,973 | B2 | 5/2018 | Ruhland et al. |
| 10,081,378 | B2 | 9/2018 | Ruhland et al. |
| 10,272,933 | B2 | 4/2019 | Weber et al. |
| 10,315,673 | B2 | 6/2019 | Kwong et al. |
| 11,176,811 | B2 | 11/2021 | Chapman et al. |
| 11,318,968 | B2 | 5/2022 | Jovenall |
| 11,427,238 | B2 | 8/2022 | Grimm et al. |
| 2016/0075355 | A1* | 3/2016 | Kellner ................. B61L 25/028 701/2 |
| 2019/0071102 | A1 | 3/2019 | Sheehan et al. |
| 2021/0094597 | A1* | 4/2021 | Rush ................... B61L 15/0027 |
| 2022/0185350 | A1 | 6/2022 | Kindt et al. |
| 2022/0266876 | A1* | 8/2022 | Cooper ..................... B60T 7/18 |
| 2026/0054733 | A1* | 2/2026 | Sevel .................. B60W 30/182 |

FOREIGN PATENT DOCUMENTS

| | | | |
|---|---|---|---|
| CN | 110516003 | A | 11/2019 |
| EP | 2765053 | B1 | 10/2016 |
| EP | 3598701 | B1 | 7/2021 |
| EP | 3976441 | | 4/2022 |
| GB | 2510561 | B | 4/2016 |

OTHER PUBLICATIONS

Wabtec Corporation: "I-ETMS Protect Interoperable Electronic Train Management System"; Data Sheet; pp. 1-2; wabteccorp.com.

Rockwell Collins: "AIRNC Railwaynet Hosted Positive Train Conrol (PTC) Communication Solution"; White Paper; Jun. 2016; pp. 1-10; 147-6112-001.

* cited by examiner

SYSTEMS AND METHODS FOR INDEPENDENT CHECKING AND HEALING OF POSITIVE TRAIN CONTROL SYSTEMS

TECHNICAL FIELD

This disclosure generally relates to positive train control, and more specifically to systems and methods for independent checking and healing of positive train control systems.

BACKGROUND

Positive Train Control (PTC) systems use communication-based and processor-based train control technology to reliably and functionally prevent train accidents such as train-to-train collisions, overspeed derailments, incursions into established work zones, and movements of trains through switches left in the wrong position. PTC systems harmonize interoperability between electrical and mechanical systems to act in moments when a locomotive disregards a safety plan. For example, a PTC system may operate to apply the brakes of a locomotive in response to determining that the speed of the locomotive is greater than the allowed route speed. The Federal Railroad Administration mandates PTC systems on tracks that host a quantity of poisonous by inhalation (PIH) or intercity/commuter passenger traffic. Certain PTC systems receive System Certification from FRA pursuant to 49 CFR §§ 236.1009 and 236.1015(e)(4).

SUMMARY

The present disclosure achieves technical advantages as systems, methods, and computer-readable storage media that provide functionality for checking and healing Positive Train Control (PTC) systems. The present disclosure provides for a system integrated into a practical application with meaningful limitations that may include comparing issued mandatory directives stored in a database with onboard mandatory directives stored in the database in order to identify any mismatches between the issued mandatory directives and the onboard mandatory directives. Other meaningful limitations of the system integrated into a practical application include: electronically communicating across a communications network, when a mismatch between the issued mandatory directives and the onboard mandatory directives is identified, one or more instructions for the PTC back-office computing system to remediate the mismatch between the issued mandatory directives and the onboard mandatory directives.

The present disclosure solves the technological problem of a lack of technical functionality for checking and healing current PTC systems by providing methods and system that automatically and continuously compare issued mandatory directives with onboard mandatory directives on numerous locomotives in order to identify any mismatches between the issued mandatory directives and the onboard mandatory directives. The technological solutions provided herein, and missing from conventional systems, are more than a mere application of a manual process to a computerized environment, but rather include functionality to implement a technical process to supplement current manual solutions for monitoring PTC systems and to augment current PTC systems by providing a mechanism for automatically "healing" (i.e., correcting) errors in the PTC system (e.g., missing or duplicate mandatory directives stored in memory on numerous locomotives within a railroad system). In doing so, the present disclosure goes well beyond a mere application of the manual process to a computer.

Unlike existing solutions where personnel may be required to manually monitor PTC systems for mismatched mandatory directives on locomotives, embodiments of this disclosure provide systems and methods that automatically compare issued mandatory directives stored in a database with onboard mandatory directives in the database in order to identify any mismatches between the issued mandatory directives and the onboard mandatory directives. If any mismatches between the issued mandatory directives and the onboard mandatory directives are identified, embodiments of this disclosure electronically communicate across a communications network one or more instructions for a PTC back-office computing system to remediate the mismatch between the issued mandatory directives and the onboard mandatory directives (e.g., by storing a missing mandatory directive on the locomotive or by removing an unneeded mandatory directive from the locomotive). By providing automatic and continuous identification and remediation of mismatched mandatory directives for a vast network of locomotives, a railroad operation may be more efficiently and effectively monitored. This may increase the efficiency of the facility and reduce or eliminate the requirement for personnel to manually perform PTC system checks. This may reduce resource usage (e.g., fuel and electricity) that would otherwise be required by manual PTC system checks. Furthermore, by providing systems that automatically heal mismatched mandatory directives for a vast network of locomotives, network bandwidth and computer resources (e.g., computer memory and processing power) may be optimized or reduced by not having to be reserved for the manual monitoring of the locomotives. Other technical advantages will be readily apparent to one skilled in the art from the following figures, descriptions, and claims. Moreover, while specific advantages have been enumerated above, various embodiments may include all, some, or none of the enumerated advantages.

Accordingly, the present disclosure discloses concepts inextricably tied to computer technology such that the present disclosure provides the technological benefit of implementing functionality to automatically and continuously identify and heal mismatched mandatory directives for a vast network of locomotives. The systems and techniques of embodiments provide improved systems by providing capabilities to perform functions that are currently performed manually and to perform functions that are currently not possible.

It is an object of the disclosure to provide a system for automatically comparing issued mandatory directives stored in a database with onboard mandatory directives in the database in order to identify any mismatches between the issued mandatory directives and the onboard mandatory directives. It is a further object of the disclosure to provide methods of electronically communicating across a communications network, when a mismatch between the issued mandatory directives and the onboard mandatory directives is identified, one or more instructions for a PTC back-office computing system to remediate the mismatch between the issued mandatory directives and the onboard mandatory directives. These and other objects are provided by the present disclosure, including at least the following embodiments.

In one particular embodiment, a PTC monitoring system includes a database, one or more memory units, and one or more computer processors communicatively coupled to the one or more memory units. The one or more computer processors are configured to receive a plurality of first mandatory directives from a train authority computing system, receive a plurality of second mandatory directives from a train bulletin computing system, and store the plurality of first mandatory directives and the plurality of second mandatory directives as issued mandatory directives in the database. The one or more computer processors are further configured to receive a plurality of onboard mandatory directives from a PTC back-office computing system and store the onboard mandatory directives in the database. The plurality of onboard mandatory directives mirrors mandatory directives stored on a locomotive. The one or more computer processors are further configured to compare the issued mandatory directives with the onboard mandatory directives in order to identify any mismatches between the issued mandatory directives and the onboard mandatory directives. The one or more computer processors are further configured to electronically communicate across a communications network, when a mismatch between the issued mandatory directives and the onboard mandatory directives is identified, one or more instructions for the PTC back-office computing system to remediate the mismatch between the issued mandatory directives and the onboard mandatory directives.

In another embodiment, a method by a computing system for monitoring a PTC system includes receiving a plurality of first mandatory directives from a train authority computing system, receiving a plurality of second mandatory directives from a train bulletin computing system, and storing the plurality of first mandatory directives and the plurality of second mandatory directives as issued mandatory directives in a database. The method further includes receiving a plurality of onboard mandatory directives from a PTC back-office computing system and storing the onboard mandatory directives in the database. The plurality of onboard mandatory directives mirrors mandatory directives stored on a locomotive. The method further includes comparing the issued mandatory directives with the onboard mandatory directives in order to identify any mismatches between the issued mandatory directives and the onboard mandatory directives. The method further includes electronically communicating across a communications network, when a mismatch between the issued mandatory directives and the onboard mandatory directives is identified, one or more instructions for the PTC back-office computing system to remediate the mismatch between the issued mandatory directives and the onboard mandatory directives.

In another embodiment, one or more computer-readable non-transitory storage media embodies instructions that, when executed by a processor, cause the processor to perform operations that include receiving a plurality of first mandatory directives from a train authority computing system, receiving a plurality of second mandatory directives from a train bulletin computing system, and storing the plurality of first mandatory directives and the plurality of second mandatory directives as issued mandatory directives in a database. The operations further include receiving a plurality of onboard mandatory directives from a PTC back-office computing system and storing the onboard mandatory directives in the database. The plurality of onboard mandatory directives can mirror mandatory directives stored on a locomotive. The operations further include comparing the issued mandatory directives with the onboard mandatory directives in order to identify any mismatches between the issued mandatory directives and the onboard mandatory directives. The operations further include electronically communicating across a communications network, when a mismatch between the issued mandatory directives and the onboard mandatory directives is identified, one or more instructions for the PTC back-office computing system to remediate the mismatch between the issued mandatory directives and the onboard mandatory directives.

In embodiments, the present disclosure includes techniques for training models (e.g., machine-learning models, artificial intelligence models, algorithmic constructs, etc.) for performing or executing a designated task or a series of tasks. The disclosed techniques provide a systematic approach for the training of such models to enhance performance, accuracy, and efficiency in their respective applications. In embodiments, the techniques for training the models may include collecting a set of data from a database, conditioning the set of data to generate a set of conditioned data, and/or generating a set of training data including the collected set of data and/or the conditioned set of data. In embodiments, that model may undergo a training phase wherein the model may be exposed to the set of training data, such as through an iterative processes of learning in which the model adjusts and optimizes its parameters and algorithms to improve its performance on the designated task or series of tasks. This training phase may configure the model to develop the capability to perform its intended function with a high degree of accuracy and efficiency. In embodiments, the conditioning of the set of data may include modification, transformation, and/or the application of targeted algorithms to prepare the data for training. The conditioning step may be configured to ensure that the set of data is in an optimal state for training the model, resulting in an enhancement of the effectiveness of the model's learning process. These features and techniques not only qualify as patent-eligible features but also introduce substantial improvements to the field of computational modeling. These features are not merely theoretical but represent an integration of a concepts into a practical applications that significantly enhance the functionality, reliability, and efficiency of the models developed through these processes In embodiments, the present disclosure includes techniques for generating a notification of an event includes generating an alert that includes information specifying the location of a source of data associated with the event, formatting the alert into data structured according to an information format; and transmitting the formatted alert over a network to a device associated with a receiver based upon a destination address and a transmission schedule. In embodiments, receiving the alert enables a connection from the device associated with the receiver to the data source over the network when the device is connected to the source to retrieve the data associated with the event and causes a viewer application (e.g., a graphical user interface (GUI)) to be activated to display the data associated with the event. These features represent patent eligible features, as these features amount to significantly more than an abstract idea. These features, when considered as an ordered combination, amount to significantly more than simply organizing and comparing data. The features address the Internet-centric challenge of alerting a receiver with time sensitive information. This is addressed by transmitting the alert over a network to activate the viewer application, which enables the connection of the device of the receiver to the source over the network to retrieve the data associated with the event. These are meaningful limitations that add more than generally linking the use of an abstract idea (e.g., the general concept of organizing and comparing data) to the Internet, because they solve an Internet-centric problem with a solution that is necessarily rooted in computer technology. These features, when taken as an ordered combination, provide unconventional steps that confine the abstract idea to a particular useful application. Therefore, these features represent patent eligible subject matter The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
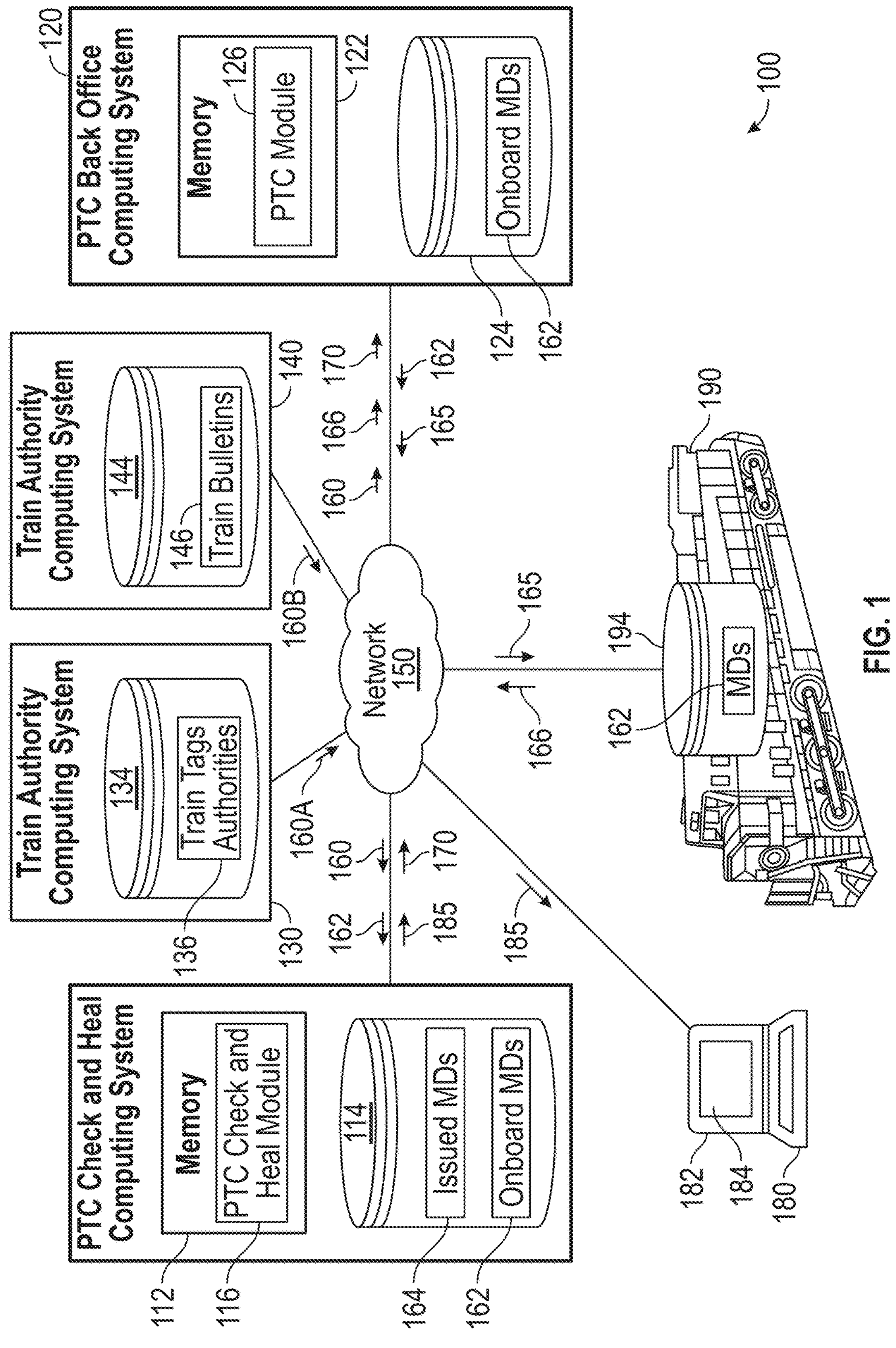
FIG. 1 is a diagram illustrating a PTC independent check and heal system, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

Positive Train Control (PTC) systems use communication-based and processor-based train control technology to reliably and functionally prevent train accidents such as train-to-train collisions, overspeed derailments, incursions into established work zones, and movements of trains through switches left in the wrong position. PTC systems harmonize interoperability between electrical and mechanical systems to act in moments when a locomotive disregards a safety plan. For example, a PTC system may operate to apply the brakes of a locomotive in response to determining that the speed of the locomotive is greater than the allowed route speed. The Federal Railroad Administration mandates PTC systems on tracks that host a quantity of poisonous by inhalation (PIH) or intercity/commuter passenger traffic. Certain PTC systems receive System Certification from FRA pursuant to 49 CFR §§ 236.1009 and 236.1015(e)(4).

PTC systems operate by issuing instructions known as mandatory directives to locomotives. For example, mandatory directives regarding tags/authorities (e.g., crossing tags, speed tags, movement authorities, etc.) may be issued to a locomotive to control the movement or speed of the locomotive. As another example, mandatory directives regarding bulletins (e.g., Form A/B bulletins, general track bulletins) may be issued to a locomotive to inform crews about track conditions, slow orders, close clearances, and the like. Issuing mandatory directives to a locomotive that is physically located a long distance away from the issuing system may be challenging at times, however, due to communications technologies used to communicate with the locomotive (e.g., radio or satellite communications). Intermittent disruptions in such communications may result in issued mandatory directives not being properly delivered or removed from a locomotive. This may result in an increased risk of accidents and a decrease in the efficiency of operation of the locomotive.

To address these and other problems regarding mandatory directives of typical PTC systems, the disclosed embodiments provide systems and methods for automatically and independently monitoring and “healing” (i.e., correcting) PTC systems. In some embodiments, the disclosed systems and methods provide a proactive and continuous cross-check monitoring system that is independent of existing electronic delivery message hops between PTC systems. The disclosed embodiments identify mismatches between mandatory directives that have been issued by source PTC systems and mandatory directives that are currently onboard a locomotive. In some embodiments, any mismatches identified between mandatory directives that have been issued by source PTC systems and mandatory directives that are currently onboard a locomotive are automatically corrected using voiceless, electronic communications without any human interaction, thereby reducing radio communications between train crews and dispatchers and thereby reducing dispatcher workload. This also reduces the opportunity for human error regarding mandatory directives which in turn increases the overall safety of railroad operations. Furthermore, the disclosed embodiments guarantee the electronic delivery of safety-critical mandatory directives to PTC trains. As a result, a train operator may be assured that the correct mandatory directives are currently stored on locomotives, thereby reducing accidents such as derailments and collisions. These and other features and advantages of the disclosed embodiments are discussed in more detail below.

Figure 2:
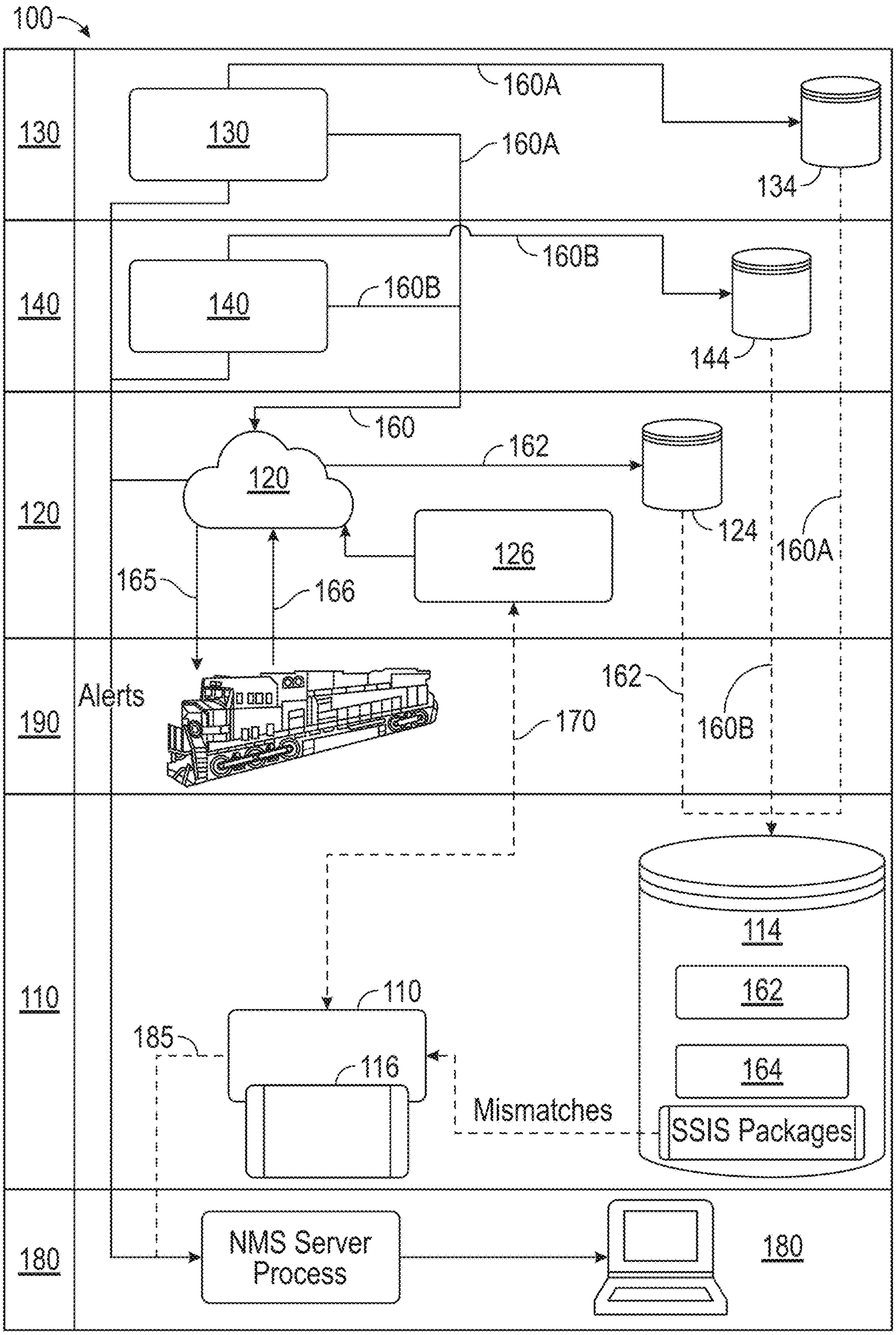
FIG. 2 is a swim lane diagram illustrating the PTC independent check and heal system of FIG. 1, according to particular embodiments.

FIG. 1 is a diagram illustrating a PTC independent check and heal system 100. FIG. 2 is a swim lane diagram illustrating the PTC independent check and heal system 100 of FIG. 1. PTC independent check and heal system 100 includes a PTC check and heal computing system 110, a PTC back-office computing system 120, a train authority computing system 130, and a train bulletin computing system 140, all of which are communicatively coupled via a network 150. PTC independent check and heal system 100 also includes a user computer system 180 and one or more locomotives 190 that are communicatively coupled to PTC back-office computing system 120 using any appropriate wireless (e.g., radio) or wired technology.

In general, PTC check and heal computing system 110 provides automatic and continuous monitoring of components of PTC independent check and heal system 100 in order to ensure that the correct mandatory directives 160 have been stored on locomotive 190 (e.g., onboard mandatory directives 162 stored in onboard database 194 of locomotive 190). To do so, PTC check and heal computing system 110 receives mandatory directives 160 (e.g., 160A and 160B) from train authority computing system 130 and train bulletin computing system 140 and stores the received mandatory directives 160 as issued mandatory directives 164 in PTC check and heal database 114. In addition, PTC check and heal computing system 110 receives onboard mandatory directives 162 from PTC back-office computing system 120 and stores the received onboard mandatory directives 162 in PTC check and heal database 114. The onboard mandatory directives 162 received from PTC back-office computing system 120 mirror the onboard mandatory directives 162 stored in onboard database 194 of locomotive 190. Next, PTC check and heal computing system 110 (e.g., via PTC check and heal module 116) continuously and automatically compares issued mandatory directives 164 and onboard mandatory directives 162 stored in PTC check and heal database 114 in order to identify any mismatches between issued mandatory directives 164 and onboard mandatory directives 162. If any mismatches between issued mandatory directives 164 and onboard mandatory directives 162 are identified, PTC check and heal computing system 110 sends remediation instructions 170 to PTC back-office computing system 120. The remediation instructions 170 are one or more instructions for PTC back-office computing system 120 to remediate the mismatch between issued mandatory directives 164 and onboard mandatory directives 162. As a result, operators of locomotive 190 may be assured that the onboard mandatory directives 162 stored on locomotive 190 are the correct mandatory directives 160 (i.e., there are no missing or extra mandatory directives 160 stored as onboard mandatory directives 162 in onboard database 194 of locomotive 190). This may result in increased safety and efficiency of locomotive 190.

PTC check and heal computing system 110 includes a processor, PTC check and heal memory 112, and PTC check and heal database 114. PTC check and heal memory 112 stores PTC check and heal module 116. PTC check and heal database 114 of PTC check and heal computing system 110 may store certain types of information for PTC check and heal computing system 110. PTC check and heal database 114 may be any one or a combination of volatile or non-volatile local or remote devices suitable for storing information. PTC check and heal database 114 may include RAM, ROM, magnetic storage devices, optical storage devices, or any other suitable information storage device or a combination of these devices. PTC check and heal database 114 may be a component internal or external to PTC check and heal computing system 110. PTC check and heal database 114 may be located in any location suitable for PTC check and heal database 114 to store information for PTC check and heal computing system 110. For example, PTC check and heal database 114 may be located in a cloud environment. In general, PTC check and heal database 114 stores issued mandatory directives 164 and onboard mandatory directives 162 which are discussed in more detail below.

In some embodiments, PTC check and heal computing system 110 includes PTC check and heal module 116 that performs one or more operations described herein. PTC check and heal module 116 represents any suitable set of instructions, logic, or code embodied in a computer-readable storage medium. For example, PTC check and heal module 116 may be embodied in PTC check and heal memory 112, a disk, a CD, or a flash drive. In particular embodiments, PTC check and heal module 116 may include instructions (e.g., a software application) executable by a processor to perform one or more of the functions described herein. Particular methods that may be performed by PTC check and heal module 116 are described in more detail below with respect to FIG. 3.

PTC back-office computing system 120 includes a processor, PTC back-office memory 122, and PTC back-office database 124. PTC back-office memory 122 stores PTC module 126. PTC back-office database 124 of PTC back-office computing system 120 may store certain types of information for PTC back-office computing system 120. PTC back-office database 124 may be any one or a combination of volatile or non-volatile local or remote devices suitable for storing information. PTC back-office database 124 may include RAM, ROM, magnetic storage devices, optical storage devices, or any other suitable information storage device or a combination of these devices. PTC back-office database 124 may be a component internal or external to PTC back-office computing system 120. PTC back-office database 124 may be located in any location suitable for PTC back-office database 124 to store information for PTC back-office computing system 120. For example, PTC back-office database 124 may be located in a cloud environment. In general, PTC back-office database 124 stores onboard mandatory directives 162 that mirror onboard mandatory directives 162 stored in onboard database 194 of locomotive 190.

In some embodiments, PTC back-office computing system 120 includes PTC module 126 that performs one or more operations described herein. PTC module 126 represents any suitable set of instructions, logic, or code embodied in a computer-readable storage medium. For example, PTC module 126 may be embodied in PTC back-office memory 122, a disk, a CD, or a flash drive. In particular embodiments, PTC module 126 may include instructions (e.g., a software application) executable by a processor to perform one or more of the functions described herein. For example, PTC module 126 may send PTC back-office data 165 in order to add or remove a mandatory directive 160 from onboard mandatory directives 162 on locomotive 190 (e.g., in response to receiving mandatory directives 160 from train authority computing system 130 and train bulletin computing system 140). In addition, PTC module 126 may receive onboard data 166 from locomotive 190 in order to ensure that onboard mandatory directives 162 stored in PTC back-office database 124 mirror (i.e., match) onboard mandatory directives 162 stored in onboard database 194 of locomotive 190.

Train authority computing system 130 includes a processor, memory, and train authority database 134. Train authority database 134 of train authority computing system 130 may store certain types of information for train authority computing system 130. train authority database 134 may be any one or a combination of volatile or non-volatile local or remote devices suitable for storing information. Train authority database 134 may include RAM, ROM, magnetic storage devices, optical storage devices, or any other suitable information storage device or a combination of these devices. train authority database 134 may be a component internal or external to train authority computing system 130. Train authority database 134 may be located in any location suitable for train authority database 134 to store information for PTC train authority computing system 130. For example, train authority database 134 may be located in a cloud environment. In general, train authority database 134 stores tags/authorities 136.

Train bulletin computing system 140 includes a processor, memory, and train bulletin database 144. Train bulletin database 144 of train bulletin computing system 140 may store certain types of information for train bulletin computing system 140. Train bulletin database 144 may be any one or a combination of volatile or non-volatile local or remote devices suitable for storing information. Train bulletin database 144 may include RAM, ROM, magnetic storage devices, optical storage devices, or any other suitable information storage device or a combination of these devices. Train bulletin database 144 may be a component internal or external to train bulletin computing system 140. Train bulletin database 144 may be located in any location suitable for train bulletin database 144 to store information for train bulletin computing system 140. For example, train bulletin database 144 may be located in a cloud environment. In general, train bulletin database 144 stores train bulletins 146.

PTC check and heal computing system 110 is independent and separate from PTC back-office computing system 120, train authority computing system 130, and train bulletin computing system 140. That is, PTC check and heal computing system 110 is not the same computer system as PTC back-office computing system 120, train authority computing system 130, or train bulletin computing system 140. By having the processes of PTC check and heal computing system 110 be independent and separate from PTC back-office computing system 120, train authority computing system 130, and train bulletin computing system 140, any failures by the other computer systems to deliver mandatory directives 160 (e.g., via system or power failures) may be isolated to those systems and will not affect PTC check and heal computing system 110. As a result, the safety and accuracy of the of the railroad system may be further increased.

Network 150 allows communication between and amongst the various components of PTC independent check and heal system 100. This disclosure contemplates network 150 being any suitable network operable to facilitate communication between the components of PTC independent check and heal system 100. Network 150 may include any interconnecting system capable of transmitting audio, video, signals, data, messages, or any combination of the preceding. Network 150 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

In general, mandatory directives are instructions that relate to the operation of locomotive 190. Mandatory directives 160 are issued by one or more computing systems of PTC independent check and heal system 100 such as train authority computing system 130 and train bulletin computing system 140. For example, mandatory directives 160A regarding tags/authorities 136 (e.g., crossing tags, speed tags, movement authorities, etc.) may be issued by train authority computing system 130 to control the movement or speed of locomotive 190. As another example, mandatory directives 160B regarding bulletins 146 (e.g., Form A/B bulletins, general track bulletins) may be issued by train bulletin computing system 140 to inform crews of locomotive 190 about track conditions, slow orders, close clearances, and the like. Instructions regarding mandatory directives 160 are sent by train authority computing system 130 and train bulletin computing system 140 to PTC back-office computing system 120. In response, PTC module 126 of PTC back-office computing system 120 issues the mandatory directives 160 from train authority computing system 130 and train bulletin computing system 140 to locomotive 190 via PTC back-office data 165.

User computing system 180 can be any appropriate system or device that allows a user to interact with PTC independent check and heal system 100. User computing system 180 may be a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In some embodiments, user computing system 180 includes an electronic display 182 such as computer or smartphone screen. In some embodiments, user computing system 180 may be configured to provide an interface (e.g., GUI 184) that can be structured to facilitate an operator interacting with PTC independent check and heal system 100, e.g., via network 150, to execute and leverage the features provided by PTC independent check and heal system 100.

Graphical user interface (GUI) 184 can be an interface that may be displayed on electronic display 182 of user computing system 150 that can allow a user to view alerts 185 provided by PTC check and heal computing system 110. For example, if PTC check and heal computing system 110 is unable to correct onboard mandatory directives 162 stored on locomotive 190 (e.g., by removing or adding a mandatory directive 160 to onboard mandatory directives 162 stored in onboard database 194 of locomotive 190), PTC check and heal computing system 110 may provide alert 185 for display in GUI 184.

In operation and in reference to FIGS. 1 and 2, PTC independent check and heal system 100 automatically and continuously identifies any mismatches between mandatory directives 160 that have been issued by source PTC systems (e.g., train authority computing system 130 and train bulletin computing system 140) and mandatory directives 160 that are currently onboard locomotive 190 (e.g., onboard mandatory directives 162). To do so, PTC check and heal computing system 110 may receive or otherwise access a plurality of first mandatory directives 160A from train authority computing system 130. The plurality of first mandatory directives 160A may include, for example, one or more tags/authorities 136 (e.g., a crossing tag, a speed tag, a movement authority, and the like). The first mandatory directives 160A may be received or accessed from train authority database 134 of train authority computing system 130 via network 150.

In some embodiments, PTC check and heal computing system 110 may additionally or alternatively receive or otherwise access a plurality of second mandatory directives 160B from train bulletin computing system 140. The plurality of second mandatory directives 160B may include, for example, one or more train bulletins 146 (a Form A bulletin, a Form B bulletin, a general track bulletin, and the like). The second mandatory directives 160B may be received or accessed from train bulletin database 144 of train bulletin computing system 140 via network 150.

After receiving mandatory directives 160 (e.g., mandatory directives 160A and 160B), PTC check and heal computing system 110 may store the received mandatory directives 160 as issued mandatory directives 164 in PTC check and heal database 114. Next, PTC check and heal computing system 110 may receive or otherwise access onboard mandatory directives 162 from PTC back-office computing system 120. As disclosed above, onboard mandatory directives 162 mirror the mandatory directives 162 stored in onboard database 194 of locomotive 190. In some embodiments, onboard mandatory directives 162 stored in PTC back-office database 124 may be maintained to constantly mirror onboard mandatory directives 162 stored in onboard database 194 by PTC module 126 (e.g., via onboard data 166 from locomotive 190.) After receiving onboard mandatory directives 162, PTC check and heal computing system 110 may store onboard mandatory directives 162 in PTC check and heal database 114.

Next, PTC check and heal computing system 110 may automatically and constantly compare issued mandatory directives 164 stored in PTC check and heal database 114 with onboard mandatory directives 162 stored in PTC check and heal database 114 in order to identify any mismatches between issued mandatory directives 164 and onboard mandatory directives 162. For example, PTC check and heal computing system 110 may execute a process on a periodic cycle such as every second, minute, hour, etc. that compares issued mandatory directives 164 with onboard mandatory directives 162. In some embodiments, PTC check and heal module 116 automatically and constantly compares issued mandatory directives 164 with onboard mandatory directives 162 in order to identify any mismatches between issued mandatory directives 164 and onboard mandatory directives 162. In other embodiments, a process running on PTC check and heal database 114 such as a SQL Server Integration Service (SSIS) automatically and constantly compares issued mandatory directives 164 with onboard mandatory directives 162 in order to identify any mismatches between issued mandatory directives 164 and onboard mandatory directives 162.

In response to identifying a mismatch between issued mandatory directives 164 and onboard mandatory directives 162, PTC check and heal computing system 110 electronically communicates (e.g., via network 150) one or more remediation instructions 170 for PTC back-office computing system 120 to remediate the mismatch between issued mandatory directives 164 and onboard mandatory directives 162. In some embodiments, remediation instructions 170 are delivered to PTC back-office computing system 120 using a message queuing process such as RabbitMQ. Remediation instructions 170 generally indicate that a particular mandatory directive 160 is missing from onboard mandatory directives 162 or that a particular mandatory directive 160 needs to be removed from onboard mandatory directives 162. In some embodiments, remediation instructions 170 include an instruction for PTC back-office computing system 120 to send a particular mandatory directive 160 to locomotive 190 with a status of "cut-in." In response to receiving remediation instructions 170 that indicate a particular mandatory directive 160 is missing from onboard mandatory directives 162 or that a particular mandatory directive 160 needs to be removed from onboard mandatory directives 162, PTC back-office computing system 120 may send PTC back-office data 165 to locomotive 190 in order to remediate the mismatch between issued mandatory directives 164 and onboard mandatory directives 162 (e.g., to store the missing mandatory directive 160 in onboard database 194 or to remove an unwanted mandatory directive 160 from onboard database 194).

In some embodiments, the mismatch that is identified between issued mandatory directives 164 and onboard mandatory directives 162 is a particular mandatory directive 160 that is found in issued mandatory directives 164 but is missing from onboard mandatory directives 162. In other words, the mismatch is a mandatory directive 160 that was not successfully delivered to locomotive 190. In these situations, remediation instructions 170 include one or more instructions for PTC back-office computing system 120 to resend the particular mandatory directive 160 that is missing from onboard mandatory directives 162 (e.g. via PTC back-office data 165) for storage in onboard database 194 of locomotive 190.

In some embodiments, the mismatch that is identified between issued mandatory directives 164 and onboard mandatory directives 162 is a particular mandatory directive 160 that is found in onboard mandatory directives 162 but is missing from issued mandatory directives 164. In other words, the mismatch is a mandatory directive 160 that was not successfully removed from locomotive 190. In these situations, remediation instructions 170 include one or more instructions for PTC back-office computing system 120 to remove the particular mandatory directive 160 from onboard mandatory directives 162 (e.g. via PTC back-office data 165) for storage in onboard database 194 of locomotive 190.

In some embodiments, PTC check and heal computing system 110 may monitor whether any identified mismatches between issued mandatory directives 164 and onboard mandatory directives 162 have been corrected. If a mismatch is not corrected within a certain amount of time or retries, PTC check and heal computing system 110 may send alert 185 to user computer system 180 indicating that the mismatch has not been remedied. As a specific example, PTC check and heal computing system 110, after sending remediation instructions 170 to PTC back-office computing system 120 regarding a particular missing or extra mandatory directive 160, may continue to compare issued mandatory directives 164 with onboard mandatory directives 162 as described above. If the particular missing or extra mandatory directive 160 is found again within a predetermined amount of time after sending remediation instructions 170 to PTC back-office computing system 120 (or after a certain amount of retries by PTC back-office computing system 120), PTC check and heal computing system 110 may send alert 185 to user computer system 180. Alert 185 may indicate (e.g., visually or audibly) the specific mandatory directive 160 that needs to be added to or deleted from onboard mandatory directives 162 on locomotive 190. In some embodiments, alert 185 may be sent using a message queuing process such as RabbitMQ. In some embodiments as illustrated in FIG. 2, alert 185 may be sent to user computer system 180 using a network management station (NMS) process.

The functional blocks, and components thereof, of embodiments of the present disclosure may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

Various components of PTC independent check and heal system 100 may illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

Further, the functionalities described with reference to each of the different functional blocks of PTC independent check and heal system 100 described herein are provided for purposes of illustration, rather than by way of limitation and that functionalities described as being provided by different functional blocks may be combined into a single component or may be provided via computing resources disposed in a cloud-based environment accessible over a network, such as one of network 150.

Figure 3:
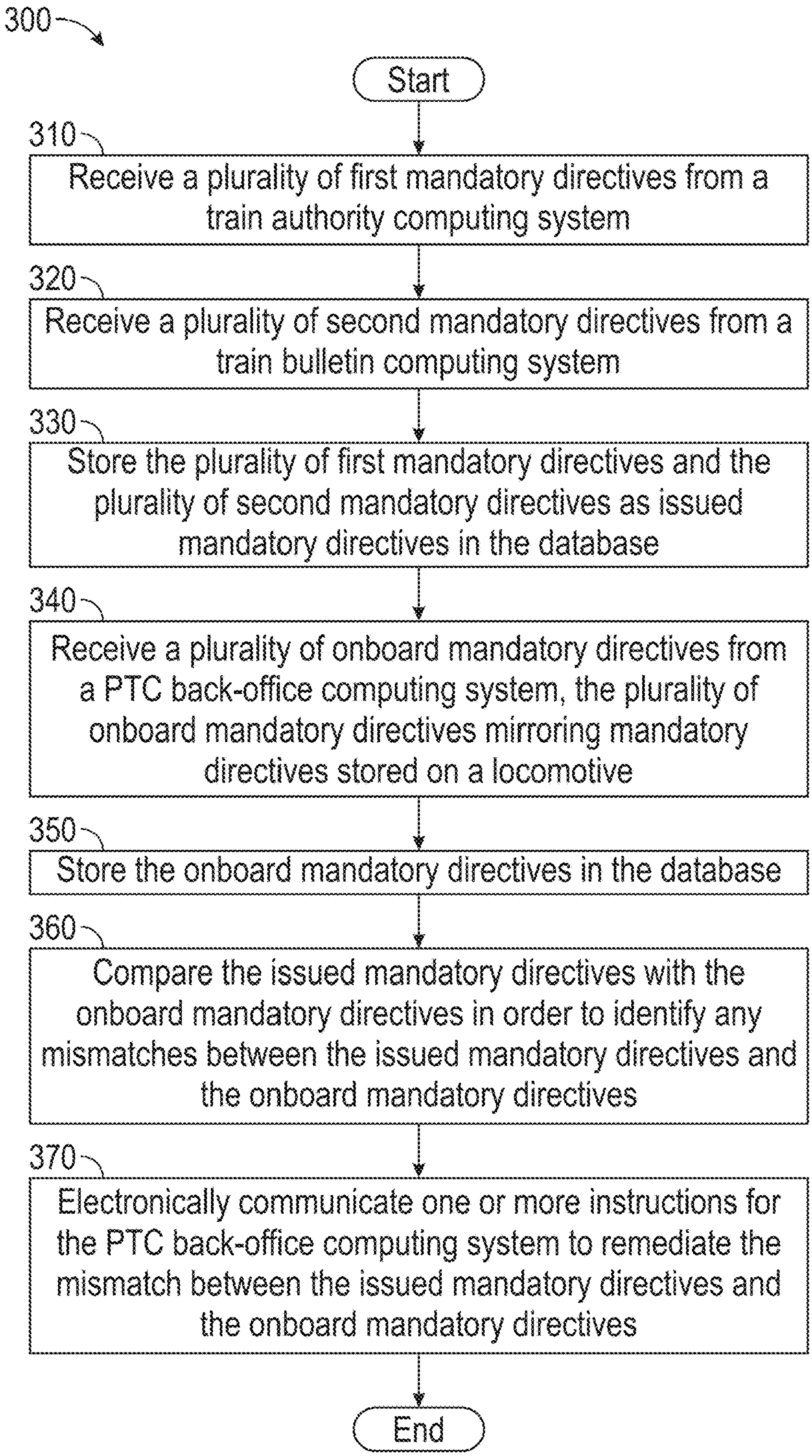
FIG. 3 is a flow diagram illustrating an example method for independently monitoring and healing a PTC system, according to particular embodiments.

FIG. 3 is a flow diagram illustrating an example method 300 for independently monitoring and healing a PTC system according to certain embodiments. In some embodiments, the functions illustrated in the example blocks shown in FIG. 3 may be performed by one or more components of PTC independent check and heal system 100 (e.g., PTC check and heal computing system 110) according to embodiments herein. In some embodiments, the operations of method 300 may be stored as instructions that, when executed by one or more processors, cause the one or more processors to perform the operations of method 300.

Method 300 may begin in step 310. In step 310, method 300 receives a plurality of first mandatory directives from a train authority computing system. In some embodiments, the plurality of first mandatory directives are mandatory directives 160A. In some embodiments, the train authority computing system is train authority computing system 130. In some embodiments, the plurality of first mandatory directives includes one or more of a crossing tag, a speed tag, and a movement authority.

In step 320, method 300 receives a plurality of second mandatory directives from a train bulletin computing system. In some embodiments, the plurality of second mandatory directives are mandatory directives 160B. In some embodiments, the train bulletin computing system is train bulletin computing system 140. In some embodiments, the plurality of second mandatory directives includes one or more of a Form A bulletin, a Form B bulletin, and a general track bulletin.

In step 330, method 300 stores the plurality of first mandatory directives and the plurality of second mandatory directives as issued mandatory directives in the database. In some embodiments, the database is PTC check and heal database 114. In some embodiments, the issued mandatory directives are issued mandatory directives 164.

In step 340, method 300 receives a plurality of onboard mandatory directives from a PTC back-office computing system. In some embodiments, the onboard mandatory directives are onboard mandatory directives 162 from PTC back-office database 124. In some embodiments, the plurality of onboard mandatory directives mirror (i.e., match) mandatory directives stored in a database such as onboard database 194 on a locomotive. In step 350, method 300 stores the onboard mandatory directives in the database.

In step 360, method 300 compares the issued mandatory directives with the onboard mandatory directives stored in the database in order to identify any mismatches between the issued mandatory directives and the onboard mandatory directives. In some embodiments, step 360 may be automatically and constantly executed in order to compare the issued mandatory directives with the onboard mandatory directives in order to identify any mismatches between the issued mandatory directives and the onboard mandatory directives. For example, method 300 may execute step 360 (and possibly other steps of method 300) on a periodic cycle such as every second, minute, hour, etc. In some embodiments, a module such as PTC check and heal module 116 may be used by step 360 to compare the issued mandatory directives with the onboard mandatory directives stored in the database in order to identify any mismatches between the issued mandatory directives and the onboard mandatory directives. In other embodiments, a process running on the database such as a SQL SSIS may be used by step 360 to automatically and constantly compare the issued mandatory directives with the onboard mandatory directives in order to identify any mismatches between the issued mandatory directives and the onboard mandatory directives.

In step 370, method 300 electronically communicates one or more instructions for the PTC back-office computing system to remediate the mismatch between the issued mandatory directives and the onboard mandatory directives. In some embodiments, the one or more instructions are remediation instructions 170. In some embodiments, the one or more instructions to remediate the mismatch between the issued mandatory directives and the onboard mandatory directives are sent via network 150 to PTC check and heal computing system 110. After step 370, method 300 may end.

In some embodiments, the mismatch between the issued mandatory directives and the onboard mandatory directives of step 360 is that a particular mandatory directive is located in the issued mandatory directives but is missing from the onboard mandatory directives. In these embodiments, the one or more instructions for the PTC back-office computing system to remediate the mismatch between the issued mandatory directives and the onboard mandatory directives includes one or more instructions to resend the particular mandatory directive for storage on the locomotive. In other embodiments, the mismatch between the issued mandatory directives and the onboard mandatory directives of step 360 is that a particular mandatory directive is located in the onboard mandatory directives but is missing from the issued mandatory directives. In these embodiments, the one or more instructions for the PTC back-office computing system to remediate the mismatch between the issued mandatory directives and the onboard mandatory directives includes one or more instructions to remove the particular mandatory directive from storage on the locomotive.

In some embodiments, method 300 additionally includes determining, a predetermined amount of time after electronically communicating the one or more instructions for the PTC back-office computing system to remediate the mismatch between the issued mandatory directives and the onboard mandatory directives, that the mismatch between the issued mandatory directives and the onboard mandatory directives still exists. The predetermined amount of time may be any appropriate amount of time or retries to remediate the mismatch between the issued mandatory directives and the onboard mandatory directives. In response to determining that the mismatch between the issued mandatory directives and the onboard mandatory directives still exists, method 300 may electronically communicate an alert for display on a user computing system. The alert may be alert 185 and the user computer system may be user computer system 180.

Figure 4:
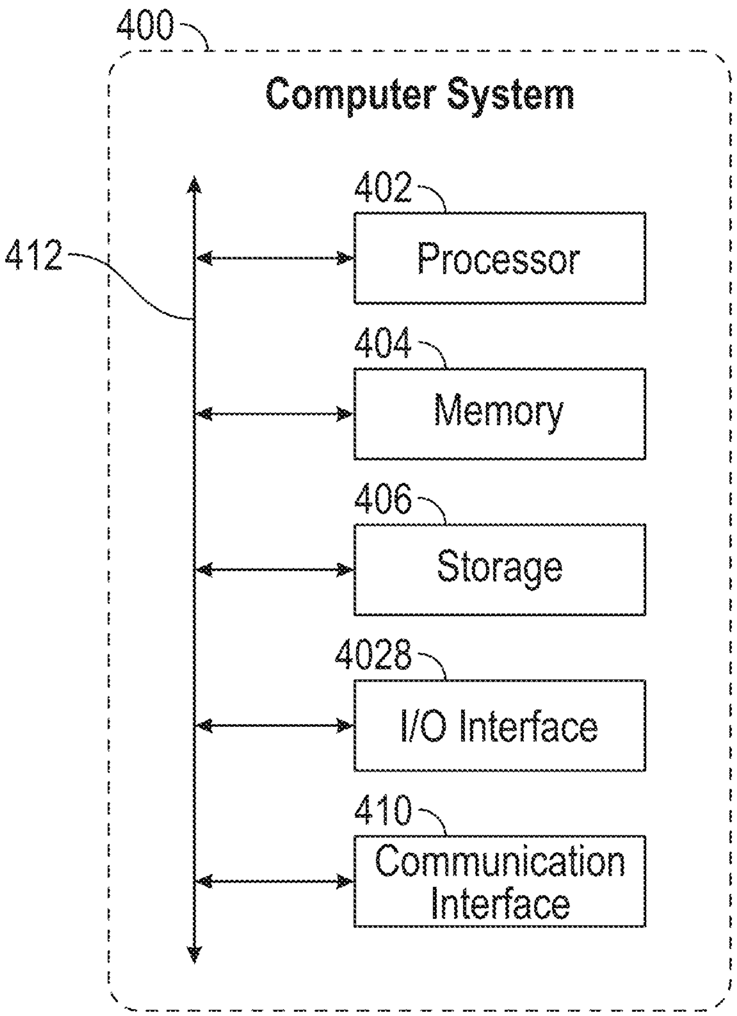
FIG. 4 is an example computer system that can be utilized to implement aspects of the various technologies presented herein, according to particular embodiments.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate. In some embodiments, computer system 400 may be utilized for one or more of PTC check and heal computing system 110, PTC back-office computing system 120, train authority computing system 130, and train bulletin computing system 140.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 can be non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules disclosed herein may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. The terms Disk and disc can include compact disc (CD), laser disc, optical disc, digital versatile disc (DVD), floppy disk, and Blu-ray disc where disks usually reproduce data magnetically, while discs usually reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function, in substantially the same way, or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A positive train control (PTC) monitoring system comprising:
- a database;
- one or more memory units; and
- one or more computer processors communicatively coupled to the one or more memory units and configured to:
  - receive a plurality of first mandatory directives from a train authority computing system;
  - receive a plurality of second mandatory directives from a train bulletin computing system;
  - store the plurality of first mandatory directives and the plurality of second mandatory directives as issued mandatory directives in the database;
  - receive a plurality of onboard mandatory directives from a PTC back-office computing system, the plurality of onboard mandatory directives mirroring mandatory directives stored on a locomotive;
  - store the onboard mandatory directives in the database;
  - compare the issued mandatory directives with the onboard mandatory directives in order to identify any mismatches between the issued mandatory directives and the onboard mandatory directives; and
  - electronically communicate across a communications network, when a mismatch between the issued mandatory directives and the onboard mandatory directives is identified, one or more instructions for the PTC back-office computing system to remediate the mismatch between the issued mandatory directives and the onboard mandatory directives.

2. The PTC monitoring system of claim 1, wherein:
- the mismatch between the issued mandatory directives and the onboard mandatory directives comprises a particular mandatory directive that is in the issued mandatory directives but is missing from the onboard mandatory directives; and
- the one or more instructions for the PTC back-office computing system to remediate the mismatch between the issued mandatory directives and the onboard mandatory directives comprises one or more instructions to resend the particular mandatory directive to the locomotive.

3. The PTC monitoring system of claim 1, wherein:
- the mismatch between the issued mandatory directives and the onboard mandatory directives comprises a particular mandatory directive that is in the onboard mandatory directives but is missing from the issued mandatory directives; and
- the one or more instructions for the PTC back-office computing system to remediate the mismatch between the issued mandatory directives and the onboard mandatory directives comprises one or more instructions to remove the particular mandatory directive from the locomotive.

4. The PTC monitoring system of claim 1, wherein the one or more instructions for the PTC back-office computing system to remediate the mismatch between the issued mandatory directives and the onboard mandatory directives comprises an instruction to send a particular mandatory directive to the locomotive with a status of cut-in.

5. The PTC monitoring system of claim 1, wherein the plurality of first mandatory directives comprises one or more of:
- a crossing tag;
- a speed tag; and
- a movement authority.

6. The PTC monitoring system of claim 1, wherein the plurality of second mandatory directives comprises one or more of:
- a Form A bulletin;
- a Form B bulletin; and
- a general track bulletin.

7. The PTC monitoring system of claim 1, wherein the one or more computer processors are further configured to:
- determine, a predetermined amount of time after electronically communicating the one or more instructions for the PTC back-office computing system to remediate the mismatch between the issued mandatory directives and the onboard mandatory directives, that the mismatch between the issued mandatory directives and the onboard mandatory directives still exists; and
- in response to determining that the mismatch between the issued mandatory directives and the onboard mandatory directives still exists, electronically communicate an alert for display on a user computing system.

8. A method by a computing system for monitoring a positive train control (PTC) system, the method comprising:

receiving a plurality of first mandatory directives from a train authority computing system;

receiving a plurality of second mandatory directives from a train bulletin computing system;

storing the plurality of first mandatory directives and the plurality of second mandatory directives as issued mandatory directives in a database;

receiving a plurality of onboard mandatory directives from a PTC back-office computing system, the plurality of onboard mandatory directives mirroring mandatory directives stored on a locomotive;

storing the onboard mandatory directives in the database;

comparing the issued mandatory directives with the onboard mandatory directives in order to identify any mismatches between the issued mandatory directives and the onboard mandatory directives; and electronically communicating across a communications network, when a mismatch between the issued mandatory directives and the onboard mandatory directives is identified, one or more instructions for the PTC back-office computing system to remediate the mismatch between the issued mandatory directives and the onboard mandatory directives.

9. The method of claim 8, wherein:

the mismatch between the issued mandatory directives and the onboard mandatory directives comprises a particular mandatory directive that is in the issued mandatory directives but is missing from the onboard mandatory directives; and the one or more instructions for the PTC back-office computing system to remediate the mismatch between the issued mandatory directives and the onboard mandatory directives comprises one or more instructions to resend the particular mandatory directive to the locomotive.

10. The method of claim 8, wherein:

the mismatch between the issued mandatory directives and the onboard mandatory directives comprises a particular mandatory directive that is in the onboard mandatory directives but is missing from the issued mandatory directives; and the one or more instructions for the PTC back-office computing system to remediate the mismatch between the issued mandatory directives and the onboard mandatory directives comprises one or more instructions to remove the particular mandatory directive from the locomotive.

11. The method of claim 8, wherein the one or more instructions for the PTC back-office computing system to remediate the mismatch between the issued mandatory directives and the onboard mandatory directives comprises an instruction to send a particular mandatory directive to the locomotive with a status of cut-in.

12. The method of claim 8, wherein the plurality of first mandatory directives comprises one or more of:

a crossing tag;

a speed tag; and a movement authority.

13. The method of claim 8, wherein the plurality of second mandatory directives comprises one or more of:

a Form A bulletin;

a Form B bulletin; and a general track bulletin.

14. The method of claim 8, further comprising:

determining, a predetermined amount of time after electronically communicating the one or more instructions for the PTC back-office computing system to remediate the mismatch between the issued mandatory directives and the onboard mandatory directives, that the mismatch between the issued mandatory directives and the onboard mandatory directives still exists; and in response to determining that the mismatch between the issued mandatory directives and the onboard mandatory directives still exists, electronically communicating an alert for display on a user computing system.

15. One or more computer-readable non-transitory storage media embodying instructions that, when executed by a processor, cause the processor to perform operations comprising:

receiving a plurality of mandatory directives from a computing system;

storing the plurality of mandatory directives as issued mandatory directives in a database;

receiving a plurality of onboard mandatory directives from a positive train control (PTC) back-office computing system, the plurality of onboard mandatory directives mirroring mandatory directives stored on a locomotive;

storing the onboard mandatory directives in the database;

comparing the issued mandatory directives with the onboard mandatory directives in order to identify any mismatches between the issued mandatory directives and the onboard mandatory directives; and electronically communicating across a communications network, when a mismatch between the issued mandatory directives and the onboard mandatory directives is identified, one or more instructions for the PTC back-office computing system to remediate the mismatch between the issued mandatory directives and the onboard mandatory directives.

16. The one or more computer-readable non-transitory storage media of claim 15, wherein:

the mismatch between the issued mandatory directives and the onboard mandatory directives comprises a particular mandatory directive that is in the issued mandatory directives but is missing from the onboard mandatory directives; and the one or more instructions for the PTC back-office computing system to remediate the mismatch between the issued mandatory directives and the onboard mandatory directives comprises one or more instructions to resend the particular mandatory directive to the locomotive.

17. The one or more computer-readable non-transitory storage media of claim 15, wherein:

the mismatch between the issued mandatory directives and the onboard mandatory directives comprises a particular mandatory directive that is in the onboard mandatory directives but is missing from the issued mandatory directives; and the one or more instructions for the PTC back-office computing system to remediate the mismatch between the issued mandatory directives and the onboard mandatory directives comprises one or more instructions to remove the particular mandatory directive from the locomotive.

18. The one or more computer-readable non-transitory storage media of claim 15, wherein the one or more instructions for the PTC back-office computing system to remediate the mismatch between the issued mandatory directives and the onboard mandatory directives comprises an instruction to send a particular mandatory directive to the locomotive with a status of cut-in.

19. The one or more computer-readable non-transitory storage media of claim 15, wherein the plurality of mandatory directives comprises one or more of:

a crossing tag;

a speed tag;

a movement authority;

a Form A bulletin;

a Form B bulletin; and a general track bulletin.

20. The one or more computer-readable non-transitory storage media of claim 15, the operations further comprising:

determining, a predetermined amount of time after electronically communicating the one or more instructions for the PTC back-office computing system to remediate the mismatch between the issued mandatory directives and the onboard mandatory directives, that the mismatch between the issued mandatory directives and the onboard mandatory directives still exists; and in response to determining that the mismatch between the issued mandatory directives and the onboard mandatory directives still exists, electronically communicating an alert for display on a user computing system.

* * * * *